United States Patent
Grimm et al.

(10) Patent No.: US 9,918,426 B2
(45) Date of Patent: Mar. 20, 2018

(54) SYSTEM AND METHOD FOR SPRAYING SEEDS DISPENSED FROM A TWIN ROW PLANTER

(71) Applicant: Capstan Ag Systems, Inc., Topeka, KS (US)

(72) Inventors: Jeffrey John Grimm, Hiawatha, KS (US); Troy C. Kolb, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 90 days.

(21) Appl. No.: 14/951,894

(22) Filed: Nov. 25, 2015

(65) Prior Publication Data

US 2016/0073576 A1 Mar. 17, 2016

Related U.S. Application Data

(62) Division of application No. 13/869,537, filed on Apr. 24, 2013, now Pat. No. 9,226,442.

(Continued)

(51) Int. Cl.
*A01C 7/10* (2006.01)
*A01C 7/12* (2006.01)
(Continued)

(52) U.S. Cl.
CPC ............... *A01C 7/06* (2013.01); *A01C 7/105* (2013.01); *A01C 7/128* (2013.01); *A01C 21/00* (2013.01); *A01C 23/007* (2013.01)

(58) Field of Classification Search
CPC ........... A01C 7/105; A01C 7/102; A01C 7/10; A01C 7/08; A01C 7/00; A01C 7/128;
(Continued)

(56) References Cited

U.S. PATENT DOCUMENTS 3,322,080 A 5/1967 Gatzke et al.
3,373,705 A 3/1968 Hansen et al.
(Continued)

OTHER PUBLICATIONS

Patent Examination Report No. 1 issued in connection with Australian Patent Application No. 2013204455, dated Oct. 21, 2014, 6 pages.

(Continued)

*Primary Examiner* — Christopher J. Novosad
(74) *Attorney, Agent, or Firm* — Armstrong Teasdale LLP

(57) ABSTRACT

A system includes a planter row unit, at least one nozzle assembly, and a controller. The planter row unit includes a first seed meter configured to dispense seeds into a first furrow at a seed frequency and a second seed meter configured to dispense seeds into a second furrow at the seed frequency. The nozzle assembly is configured to spray the seeds dispensed into the first and second furrows, and includes a valve. The controller is communicatively coupled to the valve, and is configured to determine the seed frequency of the first and second seed meters based on a speed-related parameter of the planter. The controller is further configured to control operation of the valve based on the seed frequency such that fluid is sprayed at least one of on or adjacent to each seed.

20 Claims, 8 Drawing Sheets

Related U.S. Application Data

(60) Provisional application No. 61/684,964, filed on Aug. 20, 2012.

(51) Int. Cl.
*A01C 7/06* (2006.01)
*A01C 21/00* (2006.01)
*A01C 23/00* (2006.01)

(58) Field of Classification Search
CPC .. A01C 7/127; A01C 7/12; A01C 7/06; A01C 21/00; A01C 23/007; A01C 23/00
See application file for complete search history.

(56) References Cited

U.S. PATENT DOCUMENTS

| | | |
|---|---|---|
| 3,450,074 A | 6/1969 | Gatzke et al. |
| RE31,023 E | 9/1982 | Hall, III |
| 4,448,820 A | 5/1984 | Buschor |
| 4,561,565 A | 12/1985 | Wolf et al. |
| 4,765,263 A | 8/1988 | Wilkins |
| 4,915,258 A | 4/1990 | Olson |
| 5,024,173 A | 6/1991 | Deckler |
| 5,170,909 A | 12/1992 | Lundie et al. |
| 5,379,812 A | 1/1995 | McCunn et al. |
| 5,632,212 A | 5/1997 | Barry |
| 5,650,609 A | 7/1997 | Mertins et al. |
| 5,744,793 A | 4/1998 | Skell et al. |
| 5,847,389 A | 12/1998 | Mertins et al. |
| 5,848,571 A | 12/1998 | Stufflebeam et al. |
| 5,924,371 A | 7/1999 | Flamme et al. |
| 6,047,652 A | 4/2000 | Prairie et al. |
| 6,070,539 A | 6/2000 | Flamme et al. |
| 6,081,224 A | 6/2000 | Rosenbrock |
| 6,216,615 B1 | 4/2001 | Romans |
| 6,273,010 B1 | 8/2001 | Luxon |
| 6,289,829 B1 | 9/2001 | Fish et al. |
| 6,453,832 B1 | 9/2002 | Schaffert |
| 6,477,967 B2 | 11/2002 | Rosenboom |
| 6,481,647 B1 | 11/2002 | Keaton et al. |
| 6,516,733 B1 | 2/2003 | Sauder et al. |
| 6,763,773 B2 | 7/2004 | Schaffert |
| 6,834,749 B1 | 12/2004 | Johnson |
| 7,273,016 B2 | 9/2007 | Landphair et al. |
| 7,370,589 B2 | 5/2008 | Wilkerson et al. |
| 7,717,048 B2 | 5/2010 | Peterson, Jr. et al. |
| 7,868,242 B2 | 1/2011 | Takahashi |
| 8,074,585 B2 | 12/2011 | Wilkerson et al. |
| 9,226,442 B2 * | 1/2016 | Grimm .................. A01C 7/06 |
| 2007/0193482 A1 | 8/2007 | Spooner |

OTHER PUBLICATIONS

Response to Patent Examination Report No. 1 filed in connection with Australian Patent Application No. 2013204455, dated Apr. 27, 2015, 19 pages.

Chidiu, G. M. et al., "A New Method of Soil Application of Aldicarb," Published in J. Prod. Agric. 8:43-45(1) (1995), 3 pgs.

Lohmeyer, K. H. et al., "Precision Application of Aldicarb to Enhance Efficiency of Thrips (Thysanoptera: Thripidae) Management in Cotton," Journal of Economic Entomology, 96(3):748-754. 2003, Published by the Entomological Society of America, 8 pgs.

Hancock, John. A., "Design and Evaluation of a Seed-Specific Applicator if In-Furrow Chemical Application," A Thesis Presented for the Master of Science Degree, University of Tennessee, Knoxville, May 2003, 172 pgs.

Curley, Robert G., et al., "Planter Attachment for the Spot Application of Soil Anticrustant," Paper No. 91-1013, ASAE Meeting Presentation, Jun. 23-26, 1991, Albuquerque, New Mexico, 11 pgs.

* cited by examiner

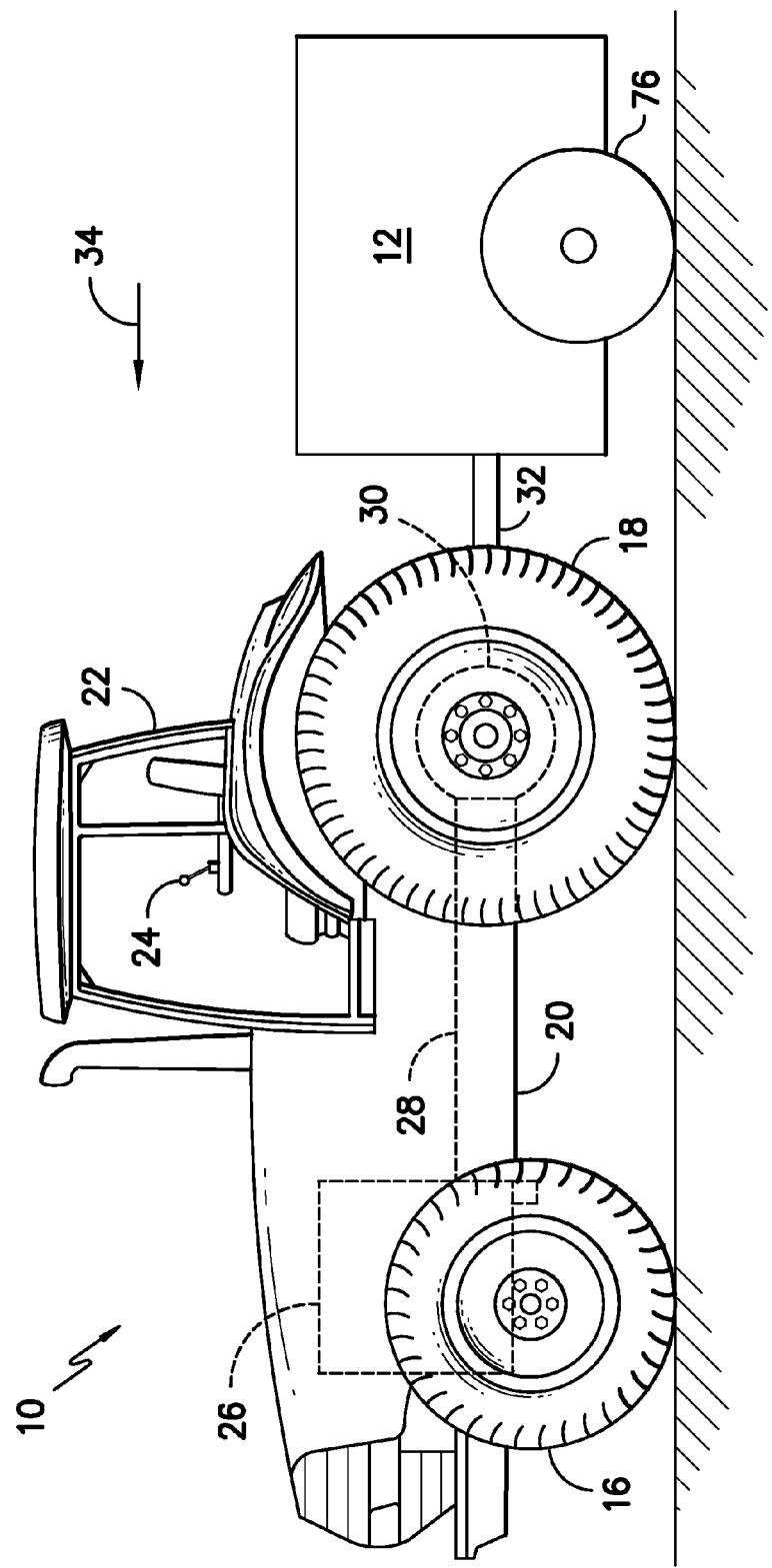
FIG. -1-

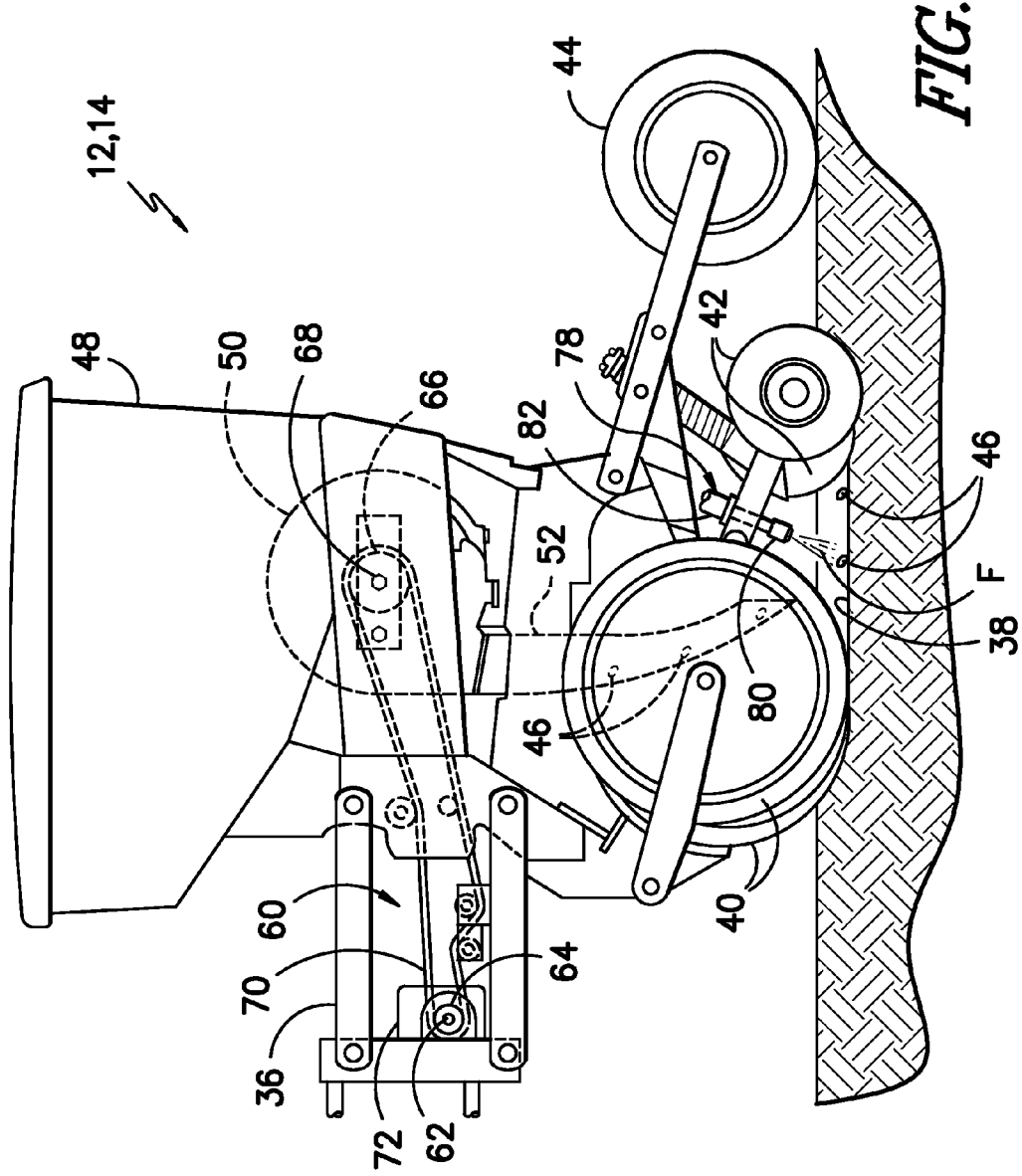

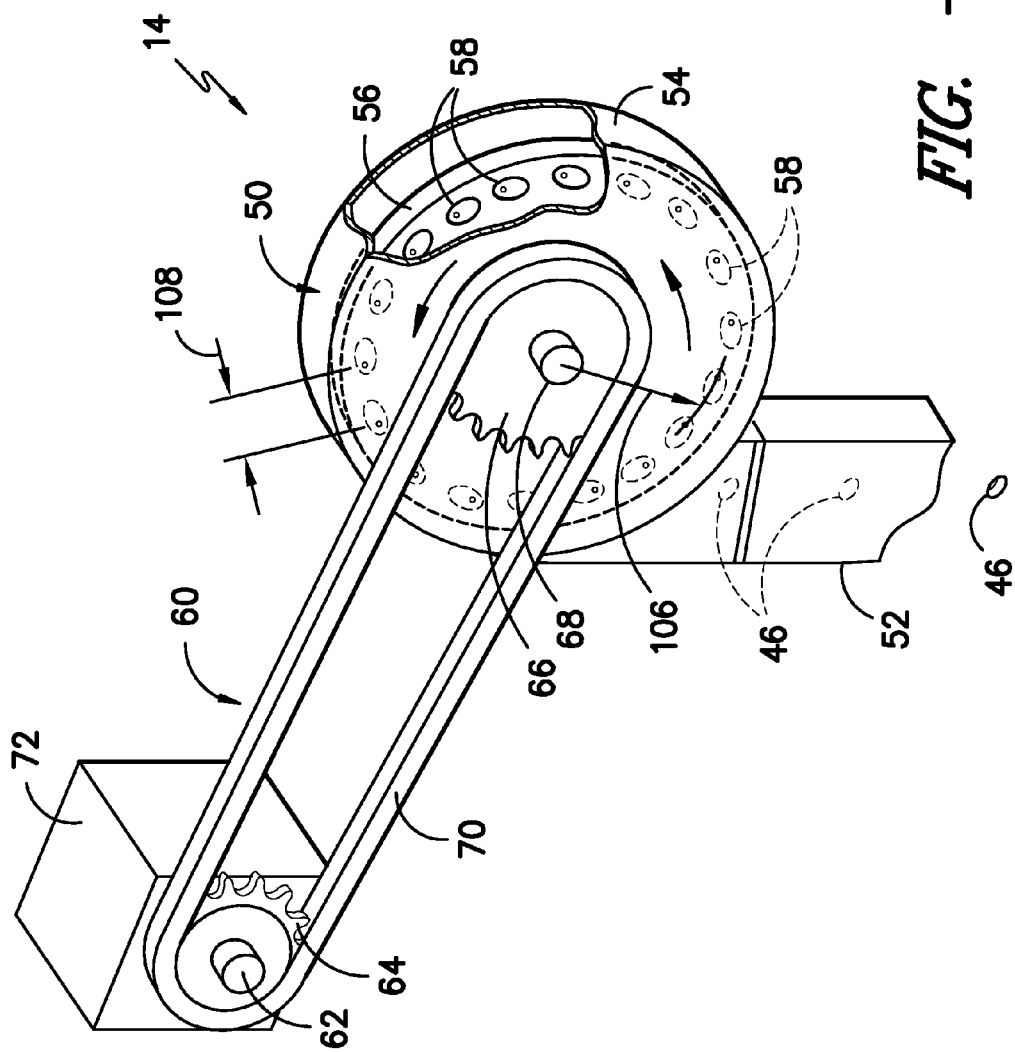
FIG. -3-

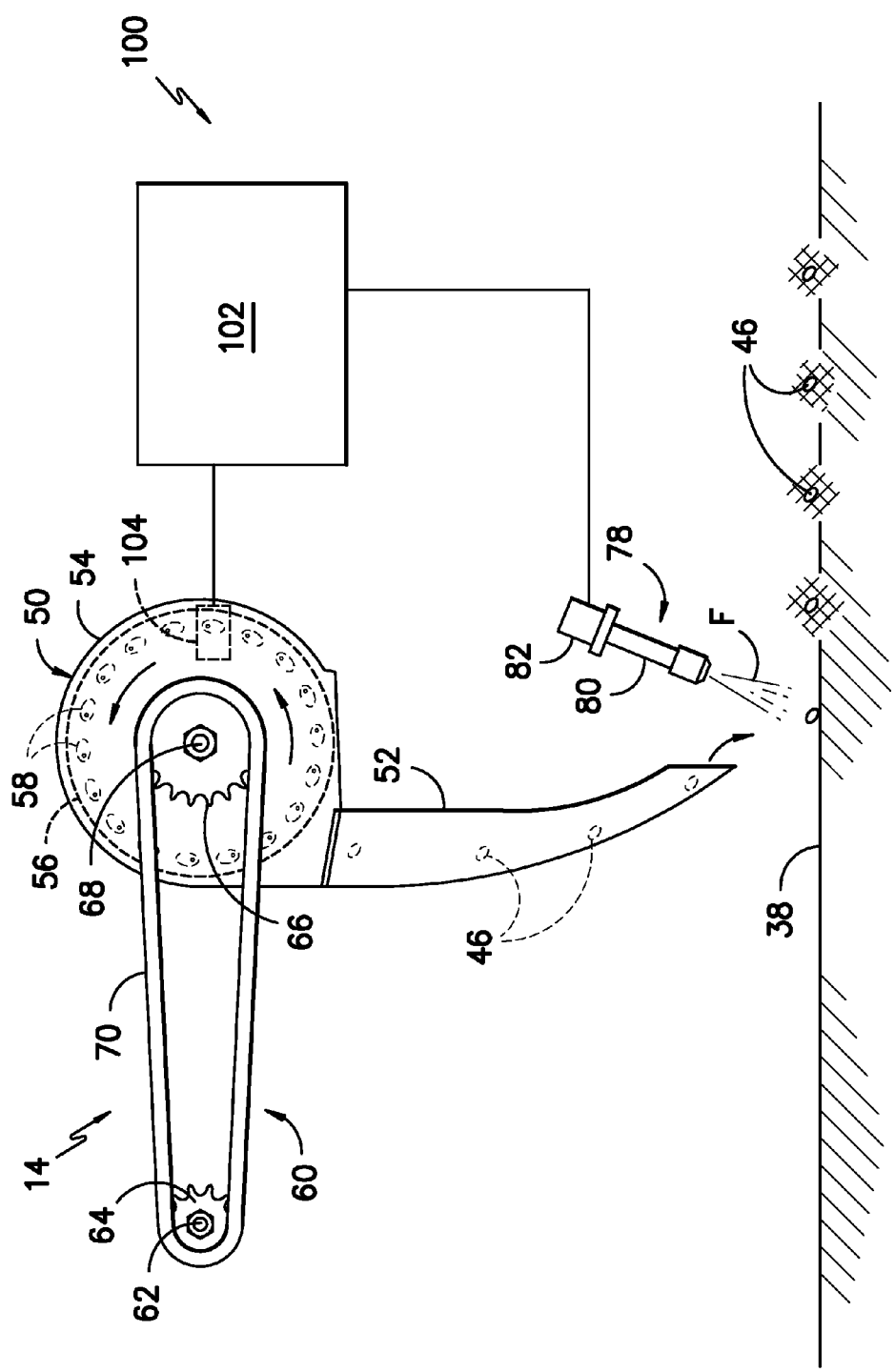
FIG. -4-

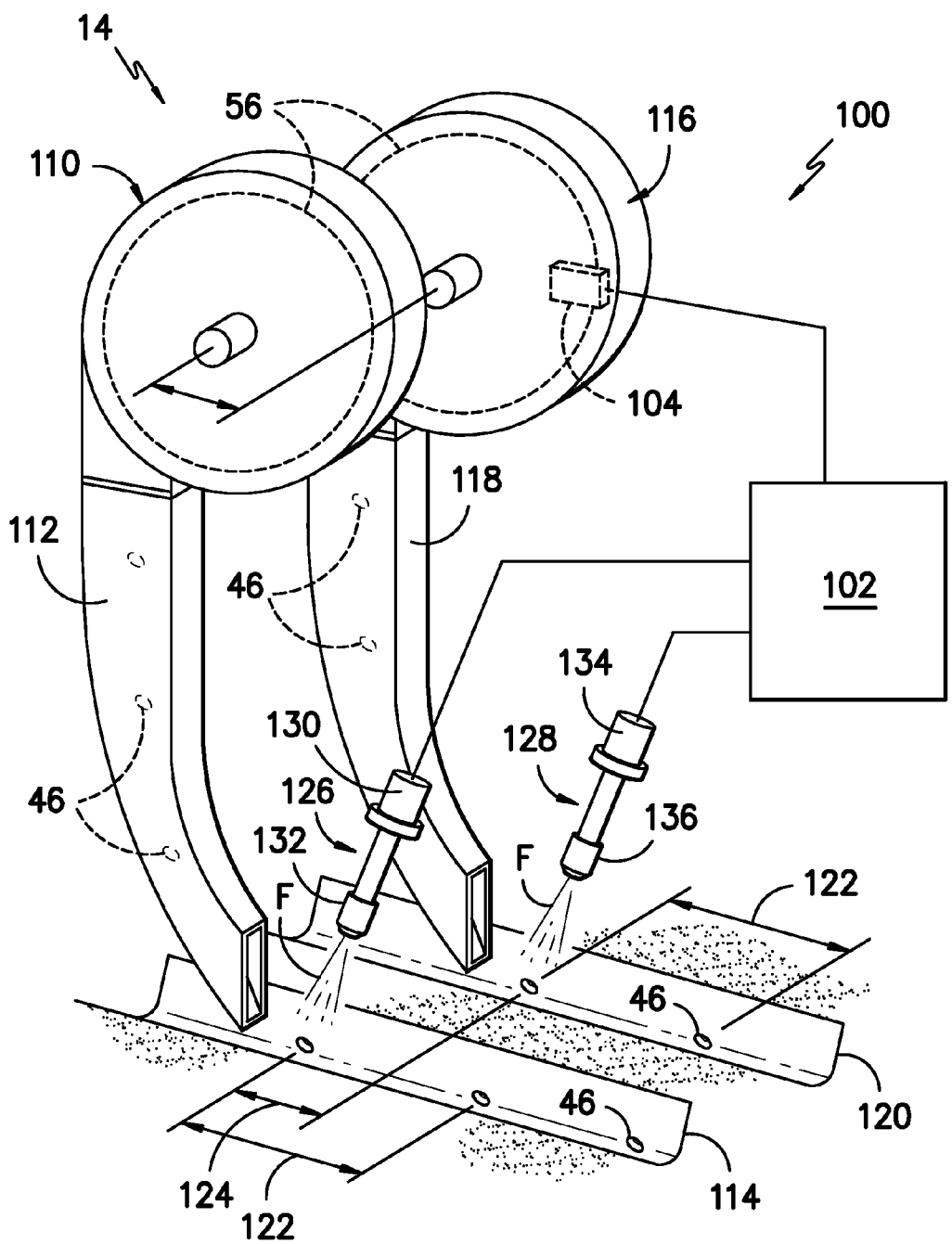
FIG. -5-

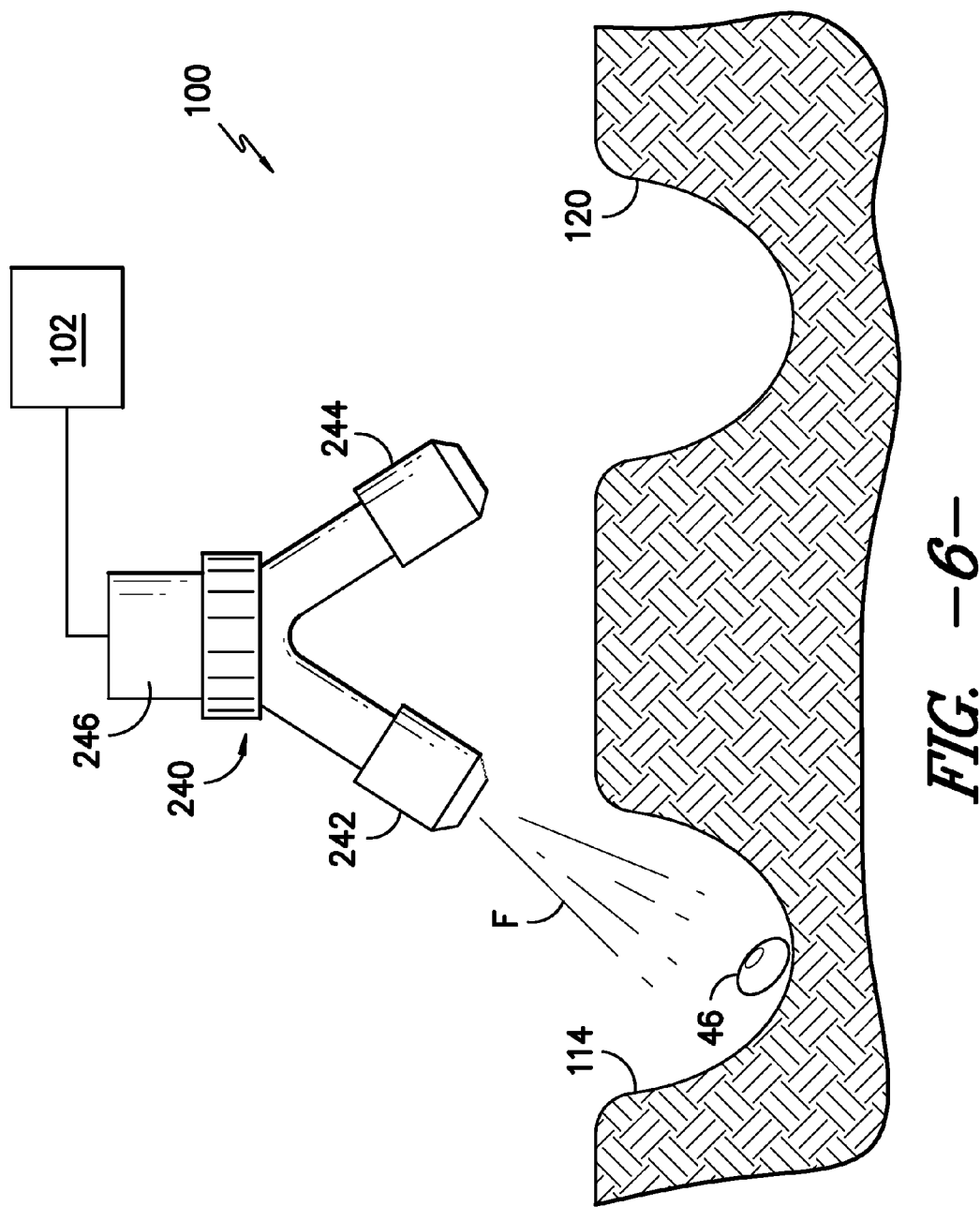
FIG. -6-

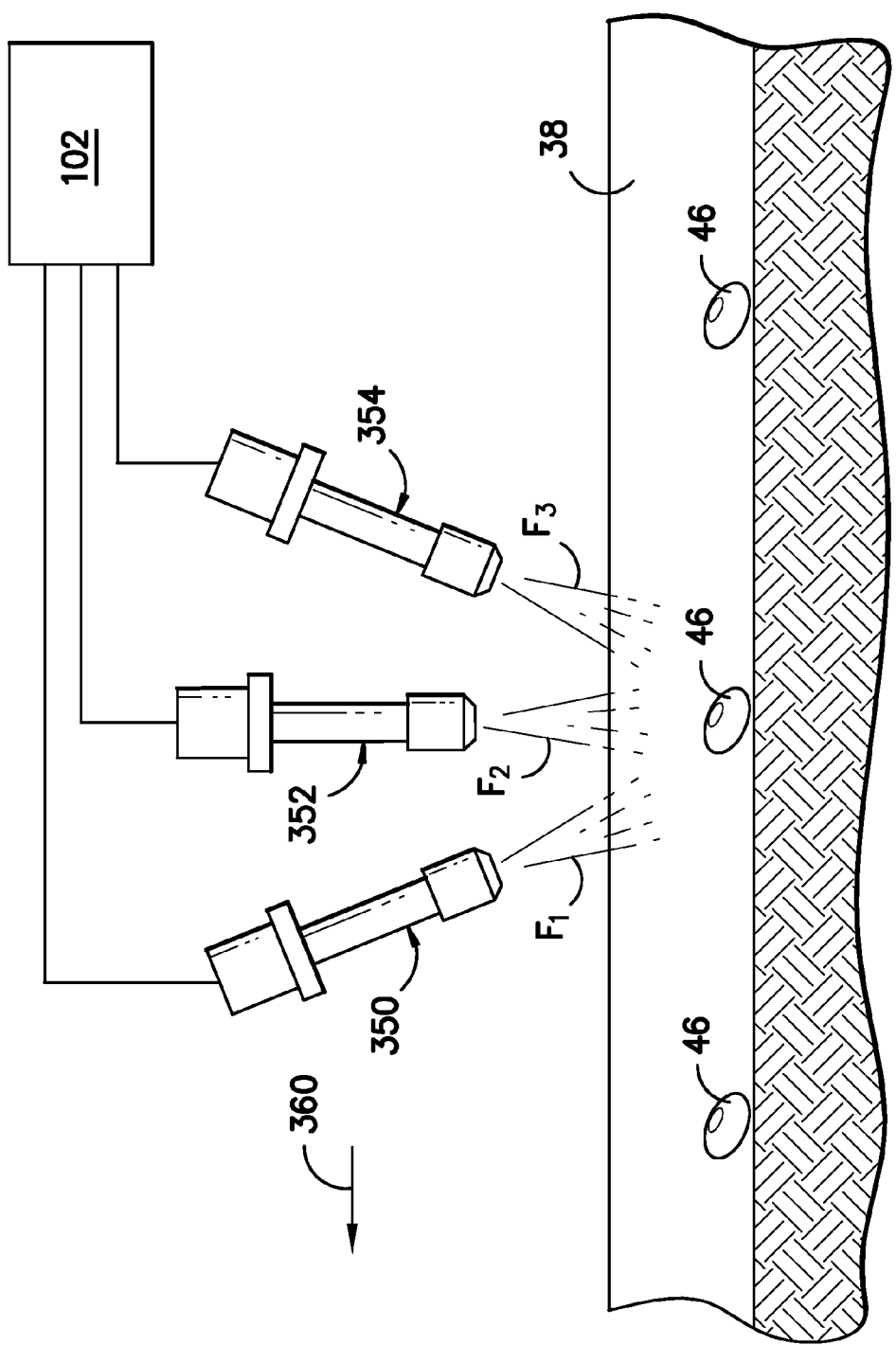
FIG. -7-

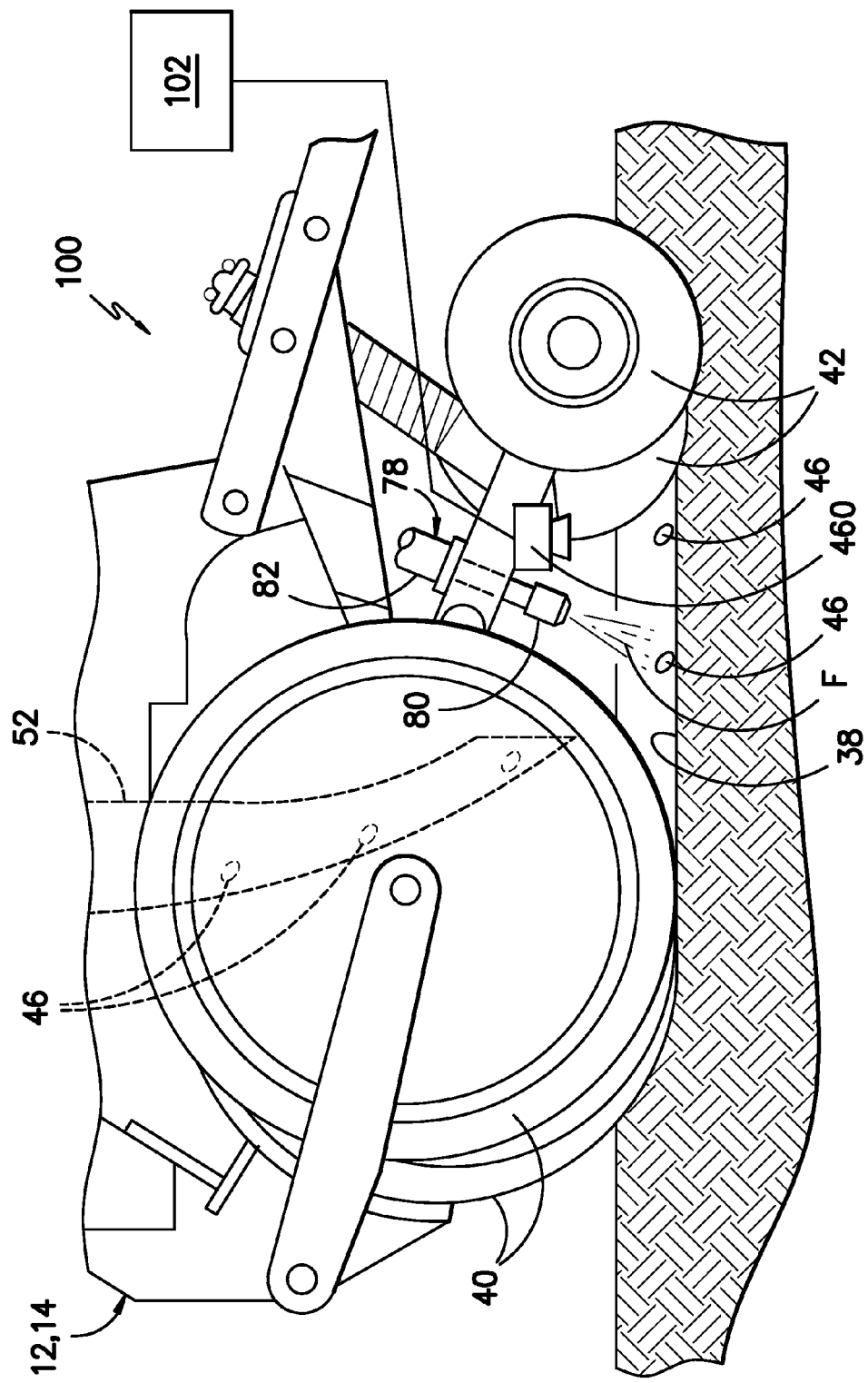
FIG. -8-

SYSTEM AND METHOD FOR SPRAYING SEEDS DISPENSED FROM A TWIN ROW PLANTER

CROSS-REFERENCE TO RELATED APPLICATIONS

This application is a divisional of U.S. patent application Ser. No. 13/869,537, filed on Apr. 24, 2013, which claims priority to U.S. Provisional Patent Application No. 61/684,964, filed on Aug. 20, 2012, the disclosures of which are hereby incorporated by reference in their entirety for all purposes.

FIELD OF THE INVENTION

The present subject matter relates generally to a system and method for spraying seeds and, more particularly, to a system and method for providing seed-specific placement of a fluid as seeds are planted within a furrow by an agricultural planter

BACKGROUND OF THE INVENTION

In the agricultural industry, plants and plant precursors (e.g., seeds) are often sprayed with an agricultural fluid at the time of planting in order to enhance germination and early development. For example, when planting certain crops, it is often desirable to spray fertilizers, pesticides, insecticides, fungicides and/or various other agricultural fluids directly over and/or adjacent to seed placements. To simplify this process, various spraying systems have been developed that are designed to spray a fluid onto seeds as they are planted or otherwise distributed on and/or within the ground.

However, such conventional spraying systems are typically configured to spray a continuous band of fluid across the length of the row in which the seeds are being planted. Accordingly, a significant amount of fluid is sprayed in the areas located between the seeds, resulting in excessive waste and increased material costs. These issues have become particularly relevant given the recent trend of narrowing the spacing between crop rows. For example, in the corn growing industry, narrow row spacings (e.g., 20 inches or less) have replaced traditional row spacings (e.g., 30 inches or more) in an attempt to provide higher seed populations and a quicker canopy for weed control. However, to implement such narrow row spacings, the seed spacing along each row must be increased, thereby widening the gap between each planted seed. As a result, the waste and material costs associated with the use of conventional spraying systems is even further increased.

To avoid the problems associated with continuous band spraying systems, improved spraying systems have been developed that provide for seed-specific placement of agricultural fluids. For example, U.S. Pat. Nos. 7,370,589 and 8,074,585 (Wilkerson et al.), both of which are hereby incorporated by reference herein in their entirety for all purposes, disclose a system that utilizes a sensor to detect seeds passing through a seed tube. Upon the detection of a seed, the sensor transmits information to a controller configured to control the operation of a fluid dispenser such that the fluid dispenser dispenses fluid onto the seed at a predetermined time after the seed is detected by the sensor. However, such individual seed timing is very complex and data intensive, thereby requiring a controller with a significant amount of processor speed.

Accordingly, a system and method for providing seed-specific placement of agricultural fluids that does not rely on individual seed timing would be welcomed in the art.

BRIEF DESCRIPTION OF THE INVENTION

Aspects and advantages of the invention will be set forth in part in the following description, or may be obvious from the description, or may be learned through practice of the invention.

Various embodiments of a system and method for providing seed-specific placement of a fluid as seeds are planted within a furrow by an agricultural planter are disclosed.

In one aspect, the present subject matter is directed to a system for providing seed-specific placement of fluid as seeds are planted by a planter. The system may generally include a seed meter configured to dispense seeds into a furrow at a seed frequency and a nozzle assembly configured to spray the seeds dispensed into the furrow. The nozzle assembly may include a valve. In addition, the system may include a controller communicatively coupled to the valve. The controller may be configured to determine the seed frequency of the seed meter based on a speed-related parameter of the planter. The controller may also be configured to control the operation of the valve based on the seed frequency such that a metered amount of fluid is sprayed at least one of on or adjacent to each seed.

In this aspect, the speed-related parameter may correspond to a rotational speed of a seed disc of the seed meter.

Also in this aspect, the speed-related parameter may correspond to a speed of a component of a drive system of the planter. For example, in one embodiment, the component may comprise at least one of a shaft, a motor, a sprocket or a chain of the drive system.

Further in this aspect, the speed-related parameter may correspond to a travel speed of the planter In this aspect, the seed meter may include a housing and a seed disc supported within the housing. The seed disc may be configured to be rotated within the housing so as to dispense seeds from the seed meter at the seed frequency.

Also in this aspect, the system may further include a sensor configured to measure a rotational speed of the seed disc. In such an embodiment, the controller may be configured to determine the seed frequency of the seed meter based on the rotational speed of the seed disc.

Further in this aspect, the system may also include a drive system configured to rotate the seed disc within the housing. The controller may be configured to control the operation of the drive system such that a rotational speed of the seed disc is varied based on a travel speed of the planter.

In this aspect, the drive system may include a drive shaft, a first sprocket coupled to the drive shaft, a second sprocket coupled to the seed disc and a chain coupled between the first and second sprockets.

Also in this aspect, the system may further include a sensor configured to measure a component speed (e.g., a rotational or linear speed) of at least one of the drive shaft, the first sprocket, the second sprocket or the chain. In such an embodiment, the controller may be configured to determine the seed frequency of the seed meter based on the component speed.

Further in this aspect, the drive system may include a motor configured to drive the drive shaft. In such an embodiment, the controller may be configured to regulate a rotational speed of the motor based on the travel speed of the planter.

In this aspect, the system may also include a sensor configured to measure a speed of the motor. In such an embodiment, the controller may be configured to determine the seed frequency of the seed meter based on the speed of the motor.

Also in this aspect, the system may include a sensor configured to measure a travel speed of the planter (which may also correspond to the travel speed of a work vehicle hauling the planter). In such an embodiment, the controller may be configured to determine the seed frequency of the seed meter based on the travel speed.

Further in this aspect, the controller may be configured to control the operation of the valve such that the valve operates at a pulse frequency that is the same as the seed frequency of the seed meter.

In this aspect, the controller may also be configured to regulate the pulse frequency of the valve to adjust for variations in the seed frequency.

Also in this aspect, the controller may be configured to regulate a pulse duration of the valve based on the travel speed of the planter.

In another aspect, the present subject matter is directed to a system for providing seed-specific placement of fluid as seeds are planted by a twin row planter. The system may generally include at least one planter row unit. The planter row unit may include a first seed meter configured to dispense seeds into a first furrow at a seed frequency and a second seed meter configured to dispense seeds into a second furrow at the seed frequency. The seeds dispensed into the first furrow may be offset from the seeds dispensed into the second furrow by an offset distance. The system may also include at least one nozzle assembly configured to spray the seeds dispensed into the first and second furrows. The nozzle assembly may include a valve. In addition, the system may include a controller communicatively coupled to the valve. The controller may be configured to determine the seed frequency of the first and second seed meters based on a speed-related parameter of the planter. The controller may also be configured to control the operation of the valve based on the seed frequency such that a metered amount of fluid is sprayed on or adjacent to each seed.

In this aspect, the speed-related parameter may correspond to a rotational speed of a seed disc of at least one of the first seed meter or the second seed meter.

Also in this aspect, the speed-related parameter may correspond to a speed of a component of a drive system of the planter. For example, in one embodiment, the component may comprise at least one of a shaft, a motor, a sprocket or a chain of the drive system.

Further in this aspect, the speed-related parameter may correspond to a travel speed of the planter In this aspect, the nozzle assembly may include a first nozzle assembly configured to spray fluid on or adjacent to the seeds dispensed from the first seed meter and a second nozzle assembly configured to spray fluid on or adjacent to the seeds dispensed from the second seed meter. The first nozzle assembly may include a first valve and the second nozzle assembly may include a second valve.

Also in this aspect, the controller may be configured to operate the first and second valves at a pulse frequency that is the same as the seed frequency of the first and second seed meters.

Further in this aspect, the first and second nozzle assemblies may be offset from one another by the offset distance. In such an embodiment, the controller may be configured to pulse the first valve simultaneously with the second valve.

In this aspect, the controller may also be configured to alternately pulse the first and second valves.

Also in this aspect, the nozzle assembly may be configured as a double-headed spray nozzle having a valve, a first nozzle portion configured to spray fluid on or adjacent to the seeds dispensed into the first furrow and a second nozzle portion configured to spray fluid on or adjacent to the seeds dispensed into the second furrow.

Further in this aspect, the valve may be configured such that fluid is continuously sprayed through one of the first nozzle portion or the second nozzle portion.

In this aspect, the controller may be configured to control the operation of the valve such that the first and second nozzle portions are alternately turned on and off.

In a further aspect, the present subject matter is directed to a method for providing seed-specific placement of fluid as seeds are planted by an agricultural planter. The planter may include a seed meter configured to dispense seeds into a furrow and a nozzle assembly configured to spray fluid on or adjacent to the seeds dispensed into the furrow. The nozzle assembly may include a valve. In several embodiments, the method may generally include monitoring a speed-related parameter of the planter, determining a seed frequency of the seed meter based on the speed-related parameter and controlling the operation of the valve based on the seed frequency such that a metered amount of fluid is sprayed on or adjacent to each seed.

In this aspect, the speed-related parameter may correspond to a rotational speed of a seed disc of the seed meter.

Also in this aspect, the speed-related parameter may correspond to a speed of a component of a drive system of the planter. For example, in one embodiment, the component may comprise at least one of a shaft, a motor, a sprocket or a chain of the drive system.

Further in this aspect, the speed-related parameter may correspond to a travel speed of the planter In this aspect, the method may also include controlling the operation of the valve such that the valve operates at a pulse frequency that is the same as the seed frequency of the seed meter.

Also in this aspect, the method may include adjusting the pulse frequency of the valve to account for variations in the seed frequency.

Further in this aspect, the planter may be configured as a twin-row planter. In such an embodiment, the planter may include a first seed meter configured to dispense seeds into a first furrow and a second seed meter configured to dispense seeds into a second furrow. The planter may also include at least one nozzle assembly configured to spray fluid on or adjacent to the seeds dispensed into the first and second furrows. The nozzle assembly may include a valve.

In this aspect, the nozzle assembly may include a first nozzle assembly configured to spray fluid on or adjacent to the seeds dispensed from the first seed meter and a second nozzle assembly configured to spray fluid on or adjacent to the seed dispensed from the second seed meter. The first nozzle assembly may include a first valve and the second nozzle assembly may include a second valve.

Also in this aspect, the method may include controlling the operation of the first and second valves such that the valves operate at a pulse frequency that is the same as the seed frequency of the seed meter.

Further in this aspect, the method may include controlling the operation of the first and second valves such that the valves are pulsed simultaneously.

In this aspect, the method may also include controlling the operation of the first and second valves such that the valves are pulsed alternately.

Also in this aspect, the nozzle assembly may be configured as a double-headed spray nozzle and may include a valve, a first nozzle portion configured to spray fluid on or adjacent to the seeds dispensed into the first furrow and a second nozzle portion configured to spray fluid on or adjacent to the seeds dispensed into the second furrow.

Further in this aspect, the method may include controlling the operation of the valve such that fluid is continuously sprayed through one of the first nozzle portion or the second nozzle portion.

In this aspect, the method may include controlling the operation of the valve such that the first and second nozzle portions are alternately turned on and off.

Also in this aspect, the method may include controlling the operation of the valve in order to align a location of each spray with a location of each seed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle and a planter for use in planting and spraying seeds;

FIG. 2 illustrates a side view of one embodiment of a row unit of the planter shown in FIG. 1;

FIG. 3 illustrates a perspective view of several components of the row unit shown in FIG. 2;

FIG. 4 illustrates a simplified, schematic view of one embodiment of a system for spraying seeds as they are planted on and/or within the ground;

FIG. 5 illustrates a simplified, schematic view of another embodiment of a system for spraying seeds as they are planted on and/or within the ground;

FIG. 6 illustrates one embodiment of a nozzle assembly that may be advantageously used when the disclosed system is implemented with a twin row planter;

FIG. 7 illustrates a simplified, schematic view of a further embodiment of a system for spraying seeds as they are planted on and/or within the ground;

FIG. 8 illustrates a close-up view of a portion of the row unit shown in FIG. 2, particularly illustrating yet another embodiment of a system for spraying seeds as they are planted on and/or within the ground.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for providing seed-specific placement of a fluid as seeds are planted into a furrow by an agricultural planter. Specifically, in several embodiments, a controller may be configured to determine the frequency at which seeds are being dispensed into the furrow. The controller may then control the operation of a nozzle assembly such that a metered amount of fluid is sprayed on and/or adjacent to each seed. For instance, in several embodiments, the controller may be configured to pulse a valve of the nozzle assembly at the same frequency as the seed frequency to allow fluid to be automatically sprayed on and/or adjacent to each seed.

As indicated above, seed spraying systems are known that utilize individual seed timing to spray seeds dispensed from a planter. However, each row unit of a conventional planter is typically designed to space seeds very evenly along a given row and provide accurate singulation (i.e., very few doubles and skips). Moreover, planters are typically operated at a relatively slow and constant speed (e.g., 5 to 6 miles per hour (MPH)). Thus, it is believed that accurate, seed-specific fluid placement may be achieved without use of the complex methodologies required for individual seed timing. Specifically, given the consistency of conventional planters in dispensing seeds at a given frequency, the nozzle assemblies of the planter may be pulsed on and off at the same frequency as the seed frequency and shifted in order to align the spray pulses with the seed positions. Such a simplified methodology may generally reduce the amount of data that must be processed by the controller, thereby allowing for the use of less expensive controllers with slower processing speeds.

Referring now to the drawings, FIGS. 1-3 illustrate various views of embodiments of a work vehicle 10 and a planter (shown schematically as box 12) for use in planting and spraying seeds. In particular, FIG. 1 illustrates a side view of one embodiment of the work vehicle 10 and the planter 12. FIG. 2 illustrates a side view of one embodiment of a row unit 14 of the planter 12 shown in FIG. 1. Additionally, FIG. 3 illustrates a perspective view of several components of the row unit 14 shown in FIG. 2.

As shown, the work vehicle 10 may include a pair of front wheels 16, a pair or rear wheels 18 and a chassis 20 coupled to and supported by the wheels 16, 18. An operator's cab 22 may be supported by a portion of the chassis 20 and may house various control devices 24 for permitting an operator to control the operation of the work vehicle 10. Additionally, the work vehicle 10 may include an engine 26 and a transmission 28 mounted on the chassis 20. The transmission 28 may be operably coupled to the engine 26 and may provide variably adjusted gear ratios for transferring engine power to the wheels 18 via an axle/differential 30.

Additionally, as shown in FIG. 1, the work vehicle 10 may be configured to be coupled to the planter 12 via a suitable coupling 32 such that the vehicle 10 may pull the planter unit 12 as it moves in a travel direction (indicated by arrow 34). In general, the planter 12 may be configured the same as or similar to any suitable agricultural planter known the art. For example, in several embodiments, the planter 12 may include a plurality of row units 14 (one of which is shown in FIG. 2) supported by a frame 36 (FIG. 2) extending along the width of the planter 12 (e.g., in a direction transverse to the travel direction 34).

As particularly shown in FIG. 2, each row unit 14 may include a furrow creation device. In general, the furrow creation device may be configured to create a trench or furrow 38 within the ground for planting seeds 46. In several embodiments, the furrow creation device may include a pair of laterally spaced opening discs 40, a pair of laterally spaced closing discs 42 and a press wheel 44. As is generally understood, the opening discs 40 may be configured to open a furrow 38 within the ground. Once seeds 46 have been deposited into the furrow 38, the closing discs 42 may be configured to close the furrow 38 over the seeds 46. The press wheel 44 may then compact the soil that has been closed over the seeds 38. Of course, it should be appreciated that, in the alternative embodiments, the furrow creation device may include any other suitable components and/or have any other suitable configuration know in the art.

Additionally, each row unit 14 may also include a seed hopper 48, a seed meter 50 and a seed tube 52. In general, the seed hopper 48, seed meter 50 and seed tube 52 may be configured to dispense seeds 46 into the furrow 38. For example, the seed hopper 48 may comprise any suitable container or other storage device that is configured for storing and dispensing seeds into the seed meter 50. Similarly, the seed meter 50 may comprise any suitable seed meter known in the art that is configured to dispense seeds 46 into the seed tube 52 at a metered rate. For example, as particularly shown in FIG. 3, in one embodiment, the seed meter 50 may include a housing 54 and a seed plate or disc 56 rotatably supported within the housing 54. As is generally understood, the seed disc 56 may include a plurality of indentions, channels and/or other suitable recessed features 58 that are spaced apart from one another around the seed disc 56 (e.g., in a circular array) to allow seeds 46 to be dispensed at a given frequency. Specifically, each recessed feature 58 may be configured to grab a single seed 46 (e.g., via a vacuum applied to the recessed feature 58) as such recessed feature 58 is rotated past the location at which seeds 46 are fed into the housing 54 from the seed hopper 48. Thus, as the seed disc 56 is rotated, seeds 46 may be carried by the recessed features 58 and subsequently dispensed into the seed tube 52. The seeds 46 may then fall through the seed tube 52 and into the furrow 38.

It should be appreciated that the metered rate or "seed frequency" at which seeds 46 are dispensed from the seed meter 50 may generally vary depending on the speed at which the seed disc 56 is rotated within the housing 54. For example, at a given rotational speed for the seed disc 56, the seed meter 50 may be configured to dispense seeds 46 at a constant seed frequency. Thus, when the planter 12 is being pulled at a constant speed, the seeds 46 may be spaced apart equally from one another within the furrow 38. However, as the travel speed of the planter 12 increases or decreases, the rotational speed of the seed disc 56 must also be increased or decreased to maintain equal spacing of the seeds 46 within the furrow 38. Such variation of the rotational speed of the seed disc 56 may generally be provided by a drive system 60, as described below.

In general, the drive system 60 may comprise any suitable device and/or combination of devices that is configured to rotate the seed disc 56. For example, in several embodiments, the drive system 60 may comprise a sprocket/chain arrangement. Specifically, as shown in FIGS. 2 and 3, the drive system 60 may include a drive shaft 62, a first sprocket 64 coupled to the drive shaft 62, a second sprocket 66 coupled to the seed disc 56 (e.g., via a shaft 68) and a chain 70 coupled between the first and second sprockets 64, 66. In such an embodiment, the drive shaft 62 may be configured to rotate the first sprocket 64, which may, in turn, rotate the second sprocket 66 via the chain 70. Such rotation of the second sprocket 66 may result in rotation of the shaft 68 and, thus, rotation of the seed disc 56 within the housing 54, thereby allowing for seeds 46 to be dispensed through the seed tube 52 and into the furrow 38 at a given seed frequency.

In several embodiments, the drive system 60 may be configured to vary the rotational speed of the seed disc 56 based on the travel speed of the planter 12. For example, as particularly shown in FIG. 3, in one embodiment, the drive system 60 may include a motor 72 (e.g., an electric or hydraulic motor) rotatably coupled to the drive shaft 62 that is configured to be controlled by a controller 102 (FIG. 4). Specifically, the controller 102 may be configured to receive signals associated with the travel speed of the planter 12 from a sensor or other suitable device. For instance, the controller 102 may be communicatively coupled to a speed sensor (e.g., an encoder or shaft sensor) configured to monitor the travel speed of the planter 12 by measuring the rotational speed of one or more of the wheels 76 (FIG. 1) of the planter 12 and/or one or more of the wheels 16, 18 of the work vehicle 10. Alternatively, the controller 102 may be communicatively coupled to a global positioning system (GPS) receiver or any other suitable speed sensing device that is capable of providing a measurement associated within the speed of the planter 12. Regardless, by monitoring the travel speed of the planter 12, the controller 102 may be configured to regulate the rotational speed of the motor 72 (and, thus, the rotational speed of the seed disc 56) based on the travel speed of the planter 12 such that a desired seed spacing may be achieved.

As an alternative to rotating the drive shaft 62 via a motor 72, the drive shaft 62 may be rotatably coupled to one or more of the wheels 76 of the planter 12 and/or one or more of the wheels 16, 18 of the work machine 10, thereby allowing the rotational speed of the seed disc 56 to be varied as a function of the travel speed of the planter 12. For instance, in one embodiment, a sprocket/chain arrangement, a gear arrangement or any other suitable rotatable coupling may be used to couple the drive shaft 62 to one or more of the wheels 76, 16, 18. Thus, as the planter 12 is pulled by the work machine 10 in the travel direction 34, the drive shaft 62 may be rotated as a function of the speed of the planter 12.

It should be appreciated that, in alternative embodiments, the drive system 60 may include any other combination of components and/or may have any other suitable configuration that allows the seed disc 56 to be rotated in a controlled manner. For example, instead of including the various components described above (e.g., the drive shaft 62, the first and second sprockets 64, 66 and the chain 70), the drive system 60 may simply include a motor coupled directly to the seed disc 56 via a suitable shaft. In another embodiment, the drive system 60 may include a sprocket/chain arrangement coupled directly between the seed disc 56 and one or more of the wheels 76 of the planter 12 and/or one or more of the wheels 16, 18 of the work vehicle 10.

Referring still to FIG. 2, each row unit 14 may also include at least one nozzle assembly 78 for spraying a fluid F on and/or adjacent to the seeds 46 dispensed from the seed tube 52. As shown, the nozzle assembly 78 may include a spray nozzle 80 and a solenoid valve 82. The nozzle 80 may generally comprise any suitable spray nozzle known in the art, such as any spray nozzle typically utilized in an agricultural spraying system. Similarly, the valve 82 may comprise any suitable solenoid valve known in the art. As is generally understood, the valve 82 may be configured to be mounted to and/or integrated within a portion of the spray nozzle 80 using any suitable mounting configuration and/or any other suitable configuration known in the art that permits the flow of fluid F through the nozzle 80 to be modified using pulse width modulation (PWM) technology. For example, the valve 82 may be mounted to the exterior of the body of the spray nozzle 80, such as by being secured to the spray nozzle 80 through the nozzle's check valve port. Alternatively, the valve 82 may be integrated into a portion of the body of the spray nozzle 30.

It should be appreciated that fluid F may be supplied to the nozzle assembly 78 from a suitable fluid source (not shown), such as a fluid tank, via a pipe or other suitable flow conduit. In addition, a pump (not shown), such as a centrifugal pump, may be positioned upstream of the nozzle assembly 78 for pumping fluid F from the fluid source to the nozzle assembly 78.

It should also be appreciated that, as an alternative to configuring the row unit 14 as a single row unit for planting seeds along a single furrow, the row unit 14 may, instead, be configured as a twin row unit for planting seeds along two closely-spaced furrows within the same harvesting row. In such an embodiment, the row units 14 may be configured the same as or similar to any suitable twin row units known in the art. For instance, in one embodiment, each row unit 14 may include two furrow creation devices for creating two adjacent furrows as well as two seed meters/tubes for dispensing seeds into each furrow. Moreover, as will be described below with reference to FIGS. 5 and 6, each row unit 14 may also include two nozzle assemblies for spraying fluid into each furrow or, alternatively, a single nozzle assembly configured to spray fluid into both furrows.

Referring now to FIG. 4, a simplified, schematic view of one embodiment of a system 100 for spraying seeds 46 dispensed from a row unit 14 is illustrated in accordance with aspects of the present subject matter. As shown, the system 100 may generally include a controller 102 configured to automatically control the operation of the nozzle assembly(ies) 78 of each row unit 14. Specifically, the controller 102 may be configured to control the timing of the opening and closing of the valve 82 (e.g., by transmitting a suitable control signal to the valve 82 to cause it to open, remain open for a calculated duration, and close) so that a metered amount of fluid F is sprayed onto and/or adjacent to each seed 46. For example, in several embodiments, the controller 102 may be configured to determine the frequency at which the seed meter 50 is dispensing seeds 46, which may then be used to control the frequency of the opening and closing of the valve 82.

In one embodiment, the controller 102 may be configured to determine the seed frequency of the seed meter 50 by directly monitoring the rotational speed of the seed disc 56. Specifically, as shown in FIG. 4, the controller 102 may be communicatively coupled to a suitable speed sensor 104 (e.g., an encoder or shaft sensor) mounted to or associated with the seed disc 56. As such, signals relating to the rotational speed of the seed disc 56 may be transmitted from the sensor 104 to the controller 102. The controller 102 may then determine the seed frequency of the seed meter 50 based on the specific design characteristics of the seed disc 56. For example, as is generally understood, a mathematical relationship may be developed that correlates the seed frequency to the rotational speed of the seed disc 56, the diameter of the seed disc 56 at the location of the recessed features 58 (e.g., diameter 106 shown in FIG. 3) and the circumferential spacing of the recessed features 58 (e.g., spacing 108 shown in FIG. 3). This mathematical relationship may be stored within the controller 102 such that, each time a speed measurement is provided by the sensor 104, the controller 102 may calculate the instantaneous seed frequency of the seed meter 50.

Alternatively, the controller 102 may be configured to determine the seed frequency based on any other speed-related parameter of the planter 16. Specifically, as indicated above, the rotational speed of the seed disc 56 and, thus, the seed frequency of the seed meter 50, may generally be controlled by the drive system 60 of each row unit 14. Thus, in several embodiments, the seed frequency may be determined by monitoring the speed of one or more components of the drive system 60. For example, a speed sensor (e.g., an encoder or shaft sensor) may be mounted to or associated with a component of the drive system 60 (e.g., the motor 72, the drive shaft 62, the first sprocket 64, the second sprocket 66, the shaft 68 and/or the chain 70) to allow the rotational or linear speed of such component to be monitored. This monitored speed may then be correlated to the seed frequency of the seed meter 50. For example, by monitoring the rotational speed of the motor 72, the seed frequency may be determined by analyzing both the design characteristics of the seed disc 56 (e.g., the diameter 106 and circumferential spacing 108 of the recessed features 58) and the sprocket ratio between first and second sprockets 64, 66.

Moreover, since the drive system 60 may be controlled as a function of the travel speed of the planter 12, the seed frequency may also be determined by monitoring the travel speed of the planter 12. For instance, as indicated above, the controller 102 may be configured to receive signals from a sensor or other suitable device (e.g., a GPS receiver) associated with the travel speed of the planter 12. This speed measurement may then be correlated to the seed frequency of the seed meter 50.

As indicated above, by determining the frequency at which the seeds are being dropped into the furrow 38, the controller 102 may be configured to control the operation of the nozzle assembly 78 to allow fluid F to be sprayed on and/or adjacent to each seed 46. Specifically, in several embodiments, the controller 102 may be configured to pulse the valve 82 at the same frequency as the seed frequency. For instance, if seeds 46 are being dropped into the furrow at a frequency of 14 seeds per second, the controller 102 may be configured to transmit an "open" control signal to the valve 82 every 14 seconds to cause it to open (thereby allowing the nozzle assembly 70 to spray a seed 46) and transmit a "close" control signal to the valve 82 every 14 seconds to cause it to close.

It should be appreciated that the pulse frequency of the valve 82 may be continuously regulated to adjust for changes in the seed frequency. For instance, as the travel speed of the planter 12 is increased/decreased (thereby necessitating an increase/decrease in the seed frequency to maintain a desired seed spacing), the pulse frequency of the valve 82 may be similarly increased/decreased to ensure that each seed is sprayed.

In addition, when the system 100 is initiated, it may be necessary to adjust the timing of the valve operation in order to align each spray pulse with a corresponding seed 46. For example, even though the nozzle assembly 78 may be spraying fluid at the same frequency as the seed frequency, the location of each spray may be offset from the location of each seed 46. To address this issue, in one embodiment, the spray locations may be shifted manually by the operator (e.g., by inputting an offset value into a control panel location in the operator's cab 22 of the work vehicle 10). For instance, after operating the system 100 for a short period of time, the operator may check the alignment of each spray location with each seed location. This may simply be a visual check or the operator may check the spray/seed alignment using a suitable spray detector. For example, an additive (e.g., a radioactive trace and/or any other suitable detectable chemical) may be added to the fluid being sprayed on and/or adjacent to each seed 46. In such an embodiment, the spray detector may be passed over the ground to detect each spray location. The detected spray locations may then be compared to the corresponding seed locations (e.g., by digging up the planted seeds 46). In the event that the spray locations are offset from the seed locations, the operator may input an offset value (e.g., two inches) into the control panel. The controller 102 may then shift the spray locations forward or backwards to ensure proper alignment with the seeds 46. It should be appreciated that, in addition to adding a detectable additive to the fluid being sprayed, a detectable coating may also be applied to the seeds 46. As such, a suitable detector(s) may be used to automatically detect both the spray locations and the seed locations, thereby providing an efficient means for comparing the relative spray/seed locations.

Alternatively, the spray locations may be automatically detected and adjusted by the controller 102. For instance, in one embodiment, the controller 102 may be communicatively coupled to a vision system (e.g., a camera or any other suitable imaging device) configured to capture images of the location of each spray relative to the location of each seed. In such an embodiment, the controller 102 may include suitable image processing algorithms for detecting the location of and determining the offset between each spray/seed. The controller 102 may then automatically adjust the spray locations based on the determined offset to align each spray with a corresponding seed 46. It should be appreciated that, as an alternative to automatically analyzing the images captured by the vision system, the images may be displayed to the operator on a suitable display panel. The operator may then manually adjust the alignment of the spray locations with the seed locations based on the displayed images.

It should be appreciated by those of ordinary skill in the art that, with the exception of twin row planters, the row units of an agricultural planter are typically operated independent of one another. As a result, each row unit may require an independent shift in order to align each spray location with each seed location. However, in the event that the row units are timed together or are otherwise operated in sync, a single, global shift may be applied to each row unit in order to align the spray locations with the seed locations.

Moreover, the controller 102 may also be configured to regulate the pulse duration of the valve 82 (i.e., the time period between the transmission of the "open" and "close" control signals) in order to control the spray band length, spray volume per seed, etc. For instance, if a constant spray band length is desired (e.g., a spray band starting an inch before each seed 46 and extending one inch after each seed 46), the controller 102 may be configured to regulate the pulse duration of the valve 82 based on the travel speed of the planter 12 in order to achieved the desired band length. Similarly, if a constant spray volume is desired, the controller 102 may be configured to regulate the pulse duration of the valve 82 based on various operating parameters of the system 100, such as the pressure of the fluid F supplied to the valve 82, the valve configuration (e.g., the sizes of the inlet and/or outlet of the valve 382), the nozzle configuration (e.g., the spray tip orifice size) and/or any other suitable operating parameters.

Referring now to FIG. 5, another embodiment of the disclosed system 100 is illustrated in accordance with aspects of the present subject matter, particularly illustrating an embodiment in which the planter 12 is configured as a twin row planter and, thus, includes row units 14 configured to dispense seeds into two adjacently disposed furrows. As shown, each row unit 14 may include a first seed meter 110 and a first seed tube 112 for dispensing seeds 46 into a first furrow 114 and a second seed meter 116 and a second seed tube 118 for dispensing seeds 46 into a second furrow 120. In such an embodiment, the seed discs 56 of the first and second seed meters 110, 116 may generally be configured to be rotated at the same speed (based on the travel speed of the planter 12) so that the seeds 46 are dispensed into the first and second furrows 114, 120 at the same seed frequency, thereby allowing for a constant seed spacing within the furrows 114, 120 (shown as spacing distance 122 in FIG. 5). For instance, the drive system 60 (FIG. 3) for each seed meter 110, 116 may be rotatably coupled to the same drive shaft 62 (FIG. 3) to ensure that the seed discs 56 are rotated at the same speed.

Additionally, as is generally understood, the seeds 46 dispensed within the first furrow 114 may be offset from the seeds 46 dispensed within the second furrow 120. To provide for such alternation of the seeds 46 between the adjacent furrows 114, 120, the first seed meter and tube 110, 112 may, in one embodiment, be offset from the second seed meter and tube 116, 119 by an offset distance 124 (e.g., a distance equal to one-half the seed spacing distance 122). As such, when the seed meters 110, 116 are dispensing seeds simultaneously, the seeds 46 dropped into the first furrow 114 may be offset from the seeds 46 dropped into the second furrow 120 by the offset distance 124. Alternatively, instead of offsetting the seed meters/tubes, the first and second seed meters 110, 116 may be operated 180° out-of-phase such that the seeds 46 dispensed into the first and second furrows 114, 120 are offset from one another by the offset distance 124.

Referring still to FIG. 5, in several embodiments, a separate nozzle assembly 126, 128 may be associated with each seed meter/tube. Specifically, as shown in FIG. 4, a first nozzle assembly 126 (including a first valve 130 and a first spray nozzle 132) may be configured to spray fluid F on and/or adjacent to each seed 46 dispensed into the first furrow 114 while a second nozzle assembly 128 (including a second valve 134 and a second spray nozzle 136) may be configured to spray fluid F on and/or adjacent to each seed 46 dispensed into the second furrow 120. In such an embodiment, the controller 102 may be configured to control the operation of each nozzle assembly 126, 128 (e.g., by controlling the first and second valves 130, 134) based on the seed frequency of the seeds meters 110, 116 to ensure that each seed is sprayed with a metered amount of fluid F. As indicated above, both seed meters 110, 116 may be configured to dispense seeds 46 at the same seed frequency. As such, the controller 102 may be configured to determine the seed frequency of the seed meters 110, 116 by simply monitoring a speed-related parameter related to either seed meter 110, 116. For instance, as shown in FIG. 5, in one embodiment, a suitable sensor 104 may be mounted to or otherwise associated with the seed disc 56 of one of the seed meters 110, 116 to allow for the seed frequency of both of the seed meters 110, 116 to be determined. Alternatively, as described above, the seed frequency may be determined by monitoring the speed of a component of the drive system 60

(FIG. 3) associated with one of the seed meters 110, 116 and/or by monitoring the overall travel speed of the planter unit 12.

The controller 102 may then be configured to pulse the valves 130, 134 of the first and second nozzle assemblies 126, 128 at the same frequency as the seed frequency. In doing so, the controller 102 may, in several embodiments, be configured to open and close the first and second valves 130, 134 simultaneously. For instance, in embodiments in which the first and second nozzle assemblies 126, 128 are offset from one another by the offset distance 124, the valves 130, 134 may be controlled such that both nozzle assemblies 126, 128 are turned on and off at the same time, thereby allowing the seeds 46 within both furrows 114, 120 to be sprayed simultaneously.

Alternatively, the controller 102 may be configured to alternately open and close the valves 130, 134 as each nozzle assembly 126, 128 passes over a seed 46 within its respective furrow 114, 120. Specifically, the controller 102 may be configured to control the valves 130, 134 such that, when the first valve 130 is opened, the second valve is closed 134 and vice versa. Such control of the valves 130, 134 may generally allow for alternating spray bands to be sprayed across the seeds 46. For instance, assuming that the seeds 46 are being planted with a 12 inch spacing (i.e., distance 122) and a six inch offset (i.e., distance 124), the first and second valves 130, 134 may be alternately opened and closed such that the first and second nozzle assemblies 126, 128 spray six inch bands across each seed 46 within their respective furrows 114, 120 (e.g., spray bands extending three inches before and three inches after each seed 46).

It should be appreciated that, by alternating the opening and closing of the valves 130, 134, a continuous flow of fluid F may be provided through the system 100, thereby preventing any undesirable pressure or flow pulses/surges (e.g., due to the continuous operation of an upstream pump). Additionally, by providing an uninterrupted flow of fluid F, the disclosed system 100 may be retrofitted into conventional planters without altering the calibration, flow rate and/or fluid pressure settings of the planter.

It should also be appreciated that, as an alternative to having two separate nozzle assemblies 128, 130, the disclosed system 100 may include a single nozzle assembly configured to spray fluid F on and/or adjacent to the seeds 46 disposed in both the first and second furrows 114, 120. For example, FIG. 6 illustrates one embodiment of a nozzle assembly 240 that may be advantageously used when the disclosed system 100 is implemented with a twin row planter. As shown, the nozzle assembly 240 includes a doubled-headed spray nozzle having a first nozzle portion 242 configured to spray fluid F into the first furrow 114 and a second nozzle portion 244 configured to spray fluid F into the second furrow 120. Additionally, the nozzle assembly 240 includes a valve 246 operably coupled to the spray nozzle 242, 244.

In general, the valve 246 may be configured such that the flow of fluid F is only directed through one nozzle portion 242, 244 at a time. For instance, the valve 246 may be configured to allow fluid F to flow through the first nozzle portion 242 when a poppet or actuator of the valve 246 is in an open position and through the second nozzle portion 244 when the actuator is in a closed position. As such, the valve 246 may be controlled based on the seed frequency of the first and second seed meters 110, 116 to allow the seeds 46 within the first and second furrows 114, 120 to be alternately sprayed. For instance, assuming again that the seeds 46 are being planted with a 12 inch spacing (i.e., distance 122) and a six inch offset (i.e., distance 124), the valve 246 may be controlled such that the first nozzle portion 242 is turned on and sprays a six inch spray band as the nozzle assembly 240 travels past a seed 46 within the first furrow 114. The flow of fluid F may then be switched to the second nozzle portion 244 such that a six inch spray band may be sprayed as the nozzle assembly 240 travels past a seed 46 within the second furrow 120.

Referring now to FIG. 7, in several embodiments, the disclosed system 100 may include a plurality of nozzle assemblies 350, 352, 354 configured to spray one or more fluids (e.g., fluids F1, F2 and F3) on and/or adjacent to the seeds 46 located within a single furrow 38. In such embodiments, the operation of each nozzle assembly 350, 352, 354 may be controlled based on the seed frequency determined by the controller 102.

For example, as shown in FIG. 7, the disclosed system 100 may include a first nozzle assembly 350, a second nozzle assembly 352, and a third nozzle assembly 354 communicatively coupled to the controller 102. In one embodiment, the nozzle assemblies 350, 352, 354 may be controlled so as to simultaneously spray fluid on and/or adjacent to each seed 46. Specifically, as shown in the illustrated embodiment, the nozzle assemblies 350, 352, 354 may be controlled such that the second nozzle assembly 352 sprays fluid F2 directly onto each seed 46 while the first and third nozzle assemblies spray fluids F1 and F3, respectively, onto either side of each seed 46. Alternatively, the timing of the nozzle assemblies 350, 352, 354 may be offset from one another. For instance, in embodiments in which each nozzle assembly 350, 352, 354 is configured to spray fluid F1, F2, F3 directly onto each seed 46, the controller 102 may be configured to activate each nozzle assembly 350, 352, 354 separately as it passes over a given seed 46. Thus, in the illustrated embodiment (assuming a travel direction shown by arrow 360), the first nozzle assembly 350 may be initially activated as it passes over a seed 46, with the second and third nozzle assemblies 352, 354 being subsequently activated to allow each nozzle assembly 350, 352, 354 to spray fluid F1, F2, F3 directly onto the seeds 46.

It should be appreciated that, in embodiments in which the disclosed system 100 includes multiple nozzle assemblies 350, 352, 354 for spraying fluids on and/or adjacent to seeds 46 located within the same furrow 38, the nozzle assemblies 350, 352, 354 may have the same or different configurations. For instance, as shown in FIG. 7, the nozzle assemblies 350, 352, 354 may be mounted at different orientations relative to the ground and/or to one another to allow for differing spray placements to be achieved. Similarly, each nozzle assembly 350, 352, 354 may be configured to spray fluid at the same or different spraying parameters, such as the same or different flow rates, pressures, spray patterns and/or the like.

Referring now to FIG. 8, as indicated above, the disclosed system 100 may also include a suitable means for automatically detecting the location of each spray relative to the location of each seed 46. For instance, as shown in FIG. 8, a suitable sensor or detector 460 may be mounted to each row unit 14 in order to detect the locations of each spray/seed, such as by mounting the detector 460 at a position on each row unit 14 at which the seed and spray locations may be detected prior to the furrow 38 being closed over the seeds 46 by the closing discs 42.

In general, the detector 460 may comprise any suitable sensor, camera, scanner and/or the like that is capable of automatically detecting the location of each spray/seed. For example, as indicated above, the detector 460 may simply comprise a digital camera configured to capture images of the location of each spray relative to each seed 46. In another embodiment, the detector 460 may comprise a hyperspectral sensor, an ultraviolet (UV) camera or sensor, an infrared (IR) camera or sensor and/or any other suitable imaging device capable of detecting light across one or more ranges within the light wavelength spectrum, including, but not limited to, UV light wavelengths, IR light wavelengths, visible light wavelengths and/or the like. In such an embodiment, a UV and/or IR tracer may be added into the fluid F being sprayed while each seed 46 may be coated with a different UV and/or IR tracer. The detector 460 may then be capable of both detecting and distinguishing the UV and/or IR light emitted from each spray and the UV and/or IR light emitted from each seed 46. In a further embodiment, the detector 460 may comprise a radioactive scanner or sensor (e.g., a Geiger counter) configured to detect low level radioactive tracers. In such an embodiment, a radioactive tracer may be added into the fluid F being sprayed while each seed 46 may be coated with a different radioactive tracer. The detector 460 may then detect the position of each spray/seed by detecting the radiation given off at each spray/seed location.

Additionally, as shown in FIG. 2, the detector 460 may be communicatively coupled to the controller 102 such that the measurement/detection signals generated by the detector 460 may be transmitted to the controller 102 for subsequent processing/analysis. For instance, in several embodiments, the controller 102 may be configured to analyze the signals received from the detector 460 in order to determine the relative locations of each spray/seed, such as by comparing each seed location to its corresponding spray location in order to determine the spacing between each seed/spray. Similarly, based on the signals received from the detector 460, the controller 102 may be configured to plot the location of each spray relative to the location of each seed 46. In such an embodiment, the plot may be displayed to the operator via a suitable display panel located within the operator's cab 22 of the work vehicle 10. The operator may then, if desired, adjust the system settings in order to adjust the relative locations of each spray/seed.

It should be appreciated that the controller 102 described herein may generally comprise any suitable computer and/or other processing unit, including any suitable combination of computers, processing units and/or the like that may be operated independently or in connection within one another. Thus, in several embodiments, the controller 102 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 102 to perform various functions including, but not limited to, controlling the operation of the valves 82, 246, determining the seed frequency of the seed meters 50, 110, 116 and/or various other suitable computer-implemented functions.

It should also be appreciated that, although the system 100 is described herein with reference to spraying seeds 46, the system 100 may generally be utilized to spray any suitable type of plant and/or plant precursor, such as seeds, seedlings, transplants, encapsulated tissue cultures and/or any other suitable plant precursors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing seed-specific placement of fluid as seeds are planted by a twin row planter, the system comprising:
a planter row unit including a first seed meter configured to dispense seeds into a first furrow at a seed frequency and a second seed meter configured to dispense seeds into a second furrow at the seed frequency, the seeds dispensed into the first furrow being offset from the seeds dispensed into the second furrow by an offset distance;
at least one nozzle assembly configured to spray the seeds dispensed into the first and second furrows, the at least one nozzle assembly including a valve;
a controller communicatively coupled to the valve, the controller being configured to determine the seed frequency of the first and second seed meters based on a speed-related parameter of the planter, the controller being further configured to control the operation of the valve based on the seed frequency such that fluid is sprayed at least one of on or adjacent to each seed.

2. The system of claim 1, wherein the speed-related parameter corresponds to at least one of a speed of a component of a drive system of the planter row unit, a travel speed of the planter or a rotational speed of a seed disc of at least one of the first seed meter or the second seed meter.

3. The system of claim 1, wherein the at least one nozzle assembly comprises a first nozzle assembly configured to spray the seeds dispensed from the first seed meter and a second nozzle assembly configured to spray the seeds dispensed from the second seed meter, the first nozzle assembly including a first valve and the second nozzle assembly including a second valve.

4. The system of claim 3, wherein the controller is configured to operate the first and second valves at a pulse frequency that is the same as the seed frequency of the first and second seed meters.

5. The system of claim 3, wherein the controller is configured to alternately open and close the first valve and the second valve such that a continuous fluid flow is established through the at least one nozzle assembly.

6. The system of claim 1, wherein the at least one nozzle assembly includes a first nozzle portion configured to spray the seeds dispensed into the first furrow, and a second nozzle portion configured to spray the seeds dispensed into the second furrow, wherein the valve is operable to control fluid flow through the first nozzle portion and the second nozzle portion.

7. The system of claim 6, wherein the valve is configured to permit fluid flow through only one of the first nozzle portion and the second nozzle portion at a time.

8. The system of claim 6, wherein the valve includes a poppet moveable between a first position, in which fluid flow is permitted through only the first nozzle portion, and a second position, in which fluid flow is permitted through only the second nozzle portion.

9. The system of claim 1, wherein at least one of the first seed meter and the second seed meter comprises a housing and a seed disc supported within the housing, the seed disc configured to be rotated within the housing so as to dispense seeds at the seed frequency.

10. The system of claim 9, further comprising a sensor configured to measure a rotational speed of the seed disc, the controller being configured to determine the seed frequency of the first and second seed meters based on the rotational speed of the seed disc.

11. The system of claim 9, further comprising a drive system configured to rotate the seed disc within the housing, the controller being configured to control the operation of the drive system such that a rotational speed of the seed disc is varied based on a travel speed of the planter.

12. The system of claim 11, wherein the drive system comprises a drive shaft, a first sprocket coupled to the drive shaft, a second sprocket coupled to the seed disc and a chain coupled between the first and second sprockets.

13. The system of claim 12, further comprising a sensor configured to measure a component speed of at least one of the drive shaft, the first sprocket, the second sprocket or the chain, the controller being configured to determine the seed frequency of the first and second seed meters based on the component speed.

14. The system of claim 12, further comprising a motor configured to drive the drive shaft and a sensor configured to measure a speed of the motor, the controller being configured to regulate a rotational speed of the motor based on the travel speed of the planter, the controller being further configured to determine the seed frequency of the first and second seed meters based on the speed of the motor.

15. A method for providing seed-specific placement of fluid as seeds are planted by a twin row planter, the planter including a first seed meter configured to dispense seeds into a first furrow, a second seed meter configured to dispense seeds into a second furrow, the seeds dispensed into the first furrow being offset from the seeds dispensed into the second furrow by an offset distance, and at least one nozzle assembly configured to spray the seeds dispensed into the first and second furrows, the at least one nozzle assembly including a valve, the method comprising:

monitoring a speed-related parameter of the planter;
determining a seed frequency of the first and second seed meters based on the speed-related parameter;
controlling the operation of the valve based on the seed frequency such that fluid is sprayed at least one of on or adjacent to each seed.

16. The method of claim 15, wherein controlling the operation of the valve based on the seed frequency comprises controlling the operation of the valve such that the valve operates at a pulse frequency that is the same as the seed frequency of the first and second seed meters.

17. The method of claim 15, wherein the at least one nozzle assembly comprises a first nozzle assembly configured to spray the seeds dispensed from the first seed meter and a second nozzle assembly configured to spray the seeds dispensed from the second seed meter, the first nozzle assembly including a first valve and the second nozzle assembly including a second valve, the method further including controlling the operation of the first valve and the second valve such that fluid is sprayed at least one of on or adjacent to each seed.

18. The method of claim 17 further including alternately opening and closing the first valve and the second valve such that a continuous fluid flow is established through the at least one nozzle assembly.

19. The method of claim 15, wherein the at least one nozzle assembly includes a first nozzle portion configured to spray the seeds dispensed into the first furrow, and a second nozzle portion configured to spray the seeds dispensed into the second furrow, the method further including controlling fluid flow through the first nozzle portion and the second nozzle portion by controlling the operation of the valve.

20. The method of claim 15, wherein at least one of the first seed meter and the second seed meter includes a housing and a seed disc rotatably supported within the housing, the seed disc configured to be rotated within the housing so as to dispense seeds at the seed frequency, wherein monitoring a speed-related parameter of the planter includes monitoring a rotational speed of the seed disc, and wherein determining the seed frequency of the first and second seed meters includes determining the seed frequency based on the rotational speed of the seed disc.

* * * * *